(12) United States Patent
Craig et al.

(10) Patent No.: US 6,260,111 B1
(45) Date of Patent: *Jul. 10, 2001

(54) SYSTEM AND METHOD FOR NETWORK POWER MANAGEMENT INCORPORATING USER IDENTITY AND PREFERENCES VIA A POWER MANAGED SMART CARD

(75) Inventors: Jeffrey A. Craig, Chapel Hill; Brian Stuart Lauber, Raleigh, both of NC (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/911,863

(22) Filed: Aug. 15, 1997

(51) Int. Cl.[7] .................................................. G06F 12/00
(52) U.S. Cl. ........................ 711/115; 711/163; 711/164; 713/320; 713/323; 713/330; 235/380; 235/492
(58) Field of Search ................................ 711/115, 163, 711/164; 380/3, 4, 25; 713/320, 323, 324, 330; 235/380, 490

(56) References Cited

U.S. PATENT DOCUMENTS

| | | | | |
|---|---|---|---|---|
| 5,633,484 | * | 5/1997 | Zancho et al. | 235/380 |
| 5,684,952 | * | 11/1997 | Stein | 709/221 |
| 5,692,197 | * | 11/1997 | Narad et al. | 713/323 |
| 5,710,884 | * | 1/1998 | Dedrick | 709/217 |
| 5,841,120 | * | 11/1998 | Bouthillier et al. | 235/382 |
| 5,877,483 | * | 3/1999 | Bilich et al. | 235/382 |
| 5,911,080 | * | 6/1999 | Yeom | 713/300 |
| 5,943,423 | * | 8/1999 | Muftic | 380/25 |
| 5,949,882 | * | 9/1999 | Angelo | 380/25 |

OTHER PUBLICATIONS

Profile Definition: Network Computer, X/Open Document No.: X975, pp. 1–9 (The Open Group, Berkshire, UK Jul. 31, 1997.

* cited by examiner

Primary Examiner—Glenn Gossage
(74) Attorney, Agent, or Firm—Myers Bigel Sibley & Sajovec, P.A.; Jeanine S. Ray-Yarletts

(57) ABSTRACT

Methods, systems and computer program products are provided which control a network computer having an access port for receiving an access card, such as a short card which includes a processor and storage for providing secure user information. The network computer is controlled by detecting the presence in the network computer of the access card and accessing the access card to obtain user specific information. The power management of the network computer may then be controlled based upon the user specific information on the detailed access card. Also provided are methods, systems and computer program products for providing user information to a network computer by storing user specific information on an access card which includes a processor and storage such that information stored on the access card may only be accessed through the processor of the access card so as to provide secure data on the access card. The access card may then be provided to a network computer and accessed to obtain user specific information independent of the network connections of the network computer. User identification information, which may be encrypted, is stored on the access card and validated to permit access to the network computer. User activity may be tracked or monitored, including transitions between and time spent in power modes, to establish power management preferences for a user on the network. The network computer may be activated and deactivated by the detected presence or absence of the access card or smart card, so that the access card may act as an intelligent "power on" for the network computer.

25 Claims, 3 Drawing Sheets

SYSTEM AND METHOD FOR NETWORK POWER MANAGEMENT INCORPORATING USER IDENTITY AND PREFERENCES VIA A POWER MANAGED SMART CARD

FIELD OF THE INVENTION

This invention relates to computer systems, methods and program products, and more particularly to personal computer and network computer systems, methods and program products.

BACKGROUND OF THE INVENTION

Personal computers are widely used in consumer and commercial environments. Personal computers include, but are not limited to, International Business Machines Corporation (IBM) and IBM-compatible computers which operate in a Windows® or OS/2® environment "IBM" and "OS/2" are trademarks of the International Business Machines Corporation of New York and "Windows" is a trademark of Microsoft Corporation of Redmond, Wash.) Personal computers can also include workstations operating in a Unix® or other environment. As is well known to those having skill in the art, a personal computer includes a central processing unit (also referred to as a "system unit") and a user interface that is responsive to user input and to the central processing unit. The user interface generally includes a display, a keyboard, and a pointing device such as a mouse. The personal computer also includes persistent storage, such as a hard disk drive, that stores programs and data. An operating system, such as Windows 95®, OS/2® or Unix®, is also stored in the persistent storage (Unix is a registered trademark of UnixSystem Laboratories Inc.). A plurality of application programs, such as computer games or an office suite, are also generally stored in the persistent storage.

Personal computers also may include a network interface application that communicates with a server over a network. The network interface application may be an Internet interface that communicates with the Internet using Hyper Text Transfer Protocol (HTTP) or other protocols. Examples of network interface applications include Netscape® Navigator® and Microsoft® Internet Explorer® ("Netscape" and "Navigator" are registered trademarks of Netscape Communications Corporation of California; and "Microsoft" and "Internet Explorer" are registered trademarks of Microsoft Corporation of Redmond, Wash.)

As personal computers and their application programs become more sophisticated, it is becoming increasingly clear that their total cost of ownership, including hardware and software maintenance and upgrades, may be much larger than the initial cost of the hardware and software itself. In fact, up to $35,000 or more may be spent annually to maintain each personal computer in a corporate environment.

Network computers have been proposed in order to reduce this overall cost of ownership. Network computers generally do not require a user or administrator to install software on the computer. Rather, all software is loaded from a network server when the network computer is started or when needed during a session. The overall specifications for network computers are described in a document entitled *Profile Definition: Network Computer, X/Open*, Document Number: X975, published by The Open Group, Berkshire, United Kingdom (UK) (1997), the disclosure of which is hereby incorporated herein by reference. Network computers have presently been announced and/or shipped by IBM Corp. (Network Station, Series 100, 300 and 1000), Sun Microsystems (Java Station), Oracle (N.C.), Neoware (Neostation), Wyse (Winterm), Acom (Netstation) and Corel Computer Corp. (Corel Video Network Computer).

Programs for network computers are typically written in Java. As is well known to those having skill in the art, Java programs, in compiled form, are generally portable and will generally run on a wide range of computers and operating systems. Java programs support referencing Universal Resource Locator (URL) identifiers with content types of audio/basic, audio/x-wav, image/gif and image/jpeg. Java provides a machine dependent desktop for executing machine independent applets.

Network computers are also known as "diskless computers" because they generally do not include persistent storage such as a floppy disk, hard disk or Compact Disk-Read Only Memory (CD-ROM). Due to the lack of persistent storage, all programs and data, except for a small loading program, are obtained from the server.

FIG. 1 is a simplified block diagram of a network computer that is connected to a server using an Internet connection. As shown in FIG. 1, network computer 100 includes a central processing unit 102 (also referred to as a "system unit") and a user interface, including a display 104, a keyboard 106, and a pointing device (mouse) 108. As is also shown in FIG. 1, the network computer does not generally include persistent storage for storing programs and data. A limited amount of volatile storage such as Random Access Memory (RAM) may be used to temporarily store applications and data while the network computer is running, but this volatile storage loses its information when the network computer is turned off. The network computer may also include permanent storage such as Read Only Memory, which may store a URL identifier to identify the server with which the computer works. The permanent storage may also include a base key which is used for security purposes.

Network computes 100 also includes a network interface 110 that allows the computer to communicate with a server 120 using a network 130, such as the Internet. Server 120 generally includes Web, Dynamic Host Configuration Protocol (DHCP), Network File System (NFS) and Trivial File Transfer Protocol (TFTP) servers. The server 120 also stores operating system images and a Java Runtime Environment (JRE). A Java desktop and other applications may also be included. Other non-Java related applications may also be included.

By providing for centralized application management at the server, network computers may reduce the management time for a computer network. Furthermore, because the applications of a network computer are centrally managed, a user may move from location to location within the network and still have available the same applications. However, because a network computer has no removable or local mass storage such as hard disk, CDROM or floppy disk drives, specific information about a user, such as power management preferences, screen saver preferences and the like are not readily transportable from machine to machine or network to network.

As an example, conventional power management uses hardware and software facilities of a computer system to minimize the average energy dissipated by a computer system. Thus, power management systems typically provide this capability by monitoring the demand for resources in a system and by "powering up" or "powering down" resources based on system requirements and demand. However, by manipulating the power available to resources, power management can interfere with a user's operation of the computer system. Thus, most power management systems typically monitor usage of the computer through, for example, keystrokes or mouse movement in combination with a timer to deactivate resources after a specified period of time. However, such simple monitoring of computer use may often result in deactivation of resources which a user still wishes and so a time delay is experienced by the user while the resources are reactivated.

The timers and the actions taken in performing power management are often established by user input and stored for a given machine. These timers are typically fixed in duration by user input and, once set, remain fixed irrespective of the use or actions taken by the user until further user input changes them. However, even though such preferences may be set by user input, in the network computer environment, such user preferences typically cannot be stored by the network computer because of its lack of local persistent storage. Furthermore, while network computers allow greater mobility to a user as to which computer system the user would utilize, power management preferences are typically not transportable with the user.

Thus, in light of the above discussion, a need exists for improvement in power management in a network computer environment.

SUMMARY OF THE INVENTION

It is one object of the present invention to provide portability of power management in network computers.

Another object of the present invention is to provide less intrusive power management to computer users.

Still another object of the present invention is to provide for a determination of the presence of a user without the need for timers or electrical switch controls.

These and other objects of the present invention are provided by methods, systems and computer program products which control a network computer having an access port for receiving an access card which includes a processor and storage for providing secure user information. The network computer is controlled by detecting the presence in the network computer of the access card and accessing the access card to obtain user specific information. The power management of the network computer may then be controlled based upon the user specific information.

By providing for power management by the presence of an access card and the information on that access card, the present invention provides portability of power management in network computers because the access card may be utilized in different network computers and in network computers operating in different networks. Furthermore, by using the presence or absence of the access card as an indicator of a user being present, the detection of a user may be made less obtrusive. Such a determination may be made without the need for timers or electrical switch controls.

In another embodiment of the present invention, the control of power management involves activating the network computer when the access card is present in the access port. A power management mode of the network computer may be set based upon the user specific information. Furthermore, the network computer may be deactivated when the access card is removed from the access port.

In still another embodiment of the present invention, user activity may be tracked to establish power management preferences for a user. The established power management preferences may then be stored on the access card. The user specific information which may be stored on the access card may include power management activity monitoring enable, power management "screen-saver" mode enablement and timeout values, power management "suspend" mode enablement and timeout values, power management power-saving aggressiveness preference, power management energy level warning levels, power management battery charging preference, and power management aggressiveness tuning factors.

In another embodiment of the present invention, user information is supplied to a network computer by storing user specific information on an access card which includes a processor and storage. The information stored on the access card may only be accessed through the processor of the access card so as to provide secure data on the access card. The access card may then be provided to a network computer and accessed to obtain user specific information independent of the network connections of the network computer. Thus, user specific information is provided which may be transported via the access card independent of the network which is available to the network computer.

In particular embodiments of the present invention, the access card is a smart card and the user specific information is encrypted user specific information. The user specific information may also be power management information and the power management information may be used to control the power management of the network computer.

In another embodiment of the present invention, the user specific information is a user identification. The user identification stored on the access card may be validated and access to the network computer by the user allowed if the user identification is valid.

The present invention also provides a network computer having a central processing unit and memory operatively associated with the central processing unit. A network interface operatively associated with the central processing unit and an access card compatible with an access card port are also included in the network computer. The access card includes an access card central processing unit and access card memory operatively associated with the access card central processing unit. An access card port operatively associated with the central processing unit receives the access card and allows for communication with the access card central processing unit. A power management controller, operatively associated with the access card port and responsive to the access card, controls the power state of the network computer.

The power management controller may include activate the network computer when an access card is present in the access card port and deactivate the network computer when an access card is removed from the access card port. Furthermore, the power management controller may establish the power management level of the network computer based upon power management information stored on the access card.

The network computer may also validate user identification stored on the access card and allow access to the network computer, by the user if it is determined that the user identification is valid.

As will be appreciated by those of skill in the art, the present invention may be embodied as systems, methods and/or computer program products.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

The present invention is described herein with respect to flowchart illustrations of embodiments or aspects of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 1:
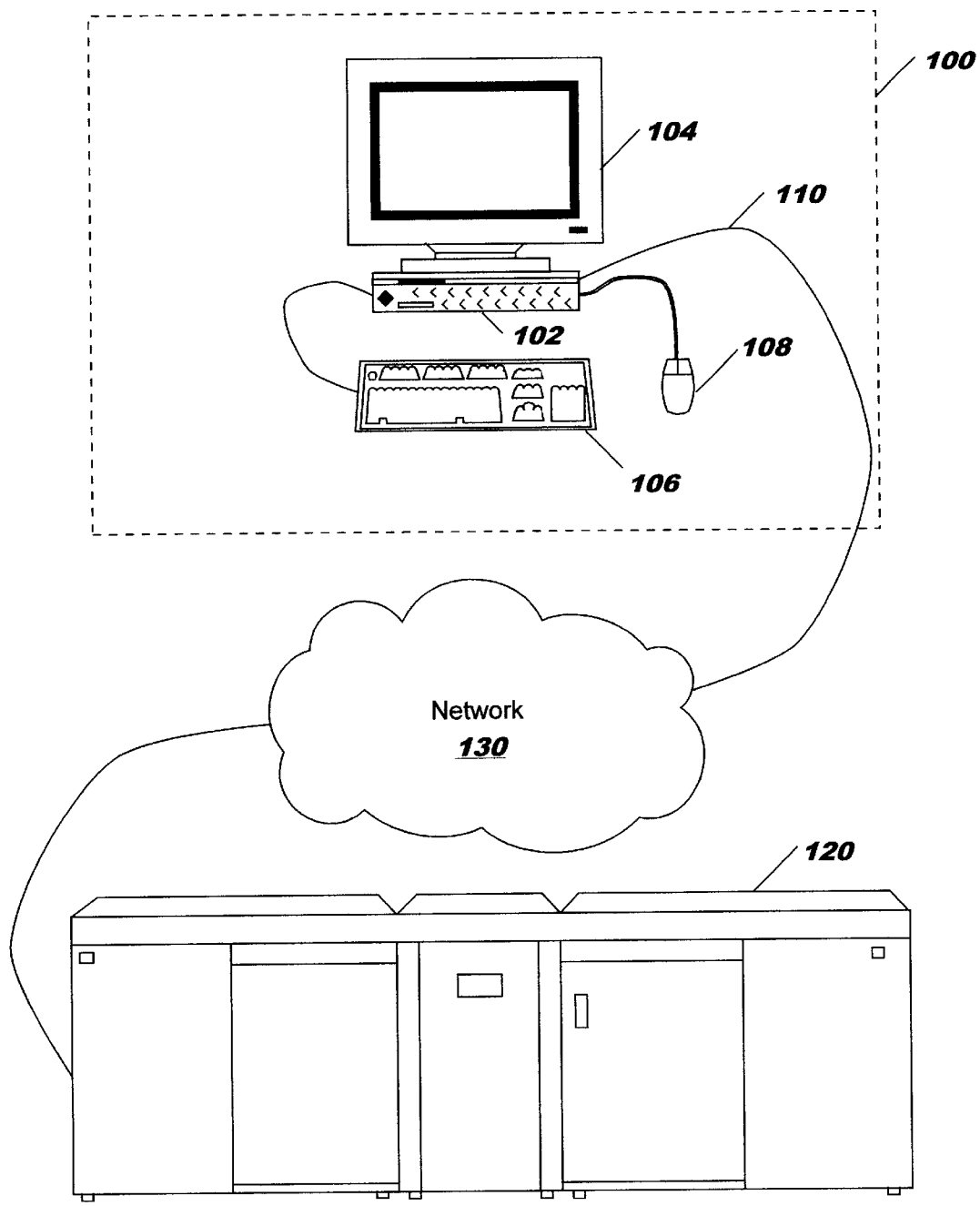
FIG. 1 is a simplified block diagram of a conventional network computer that communicates with a server over a network.
Figure 2:
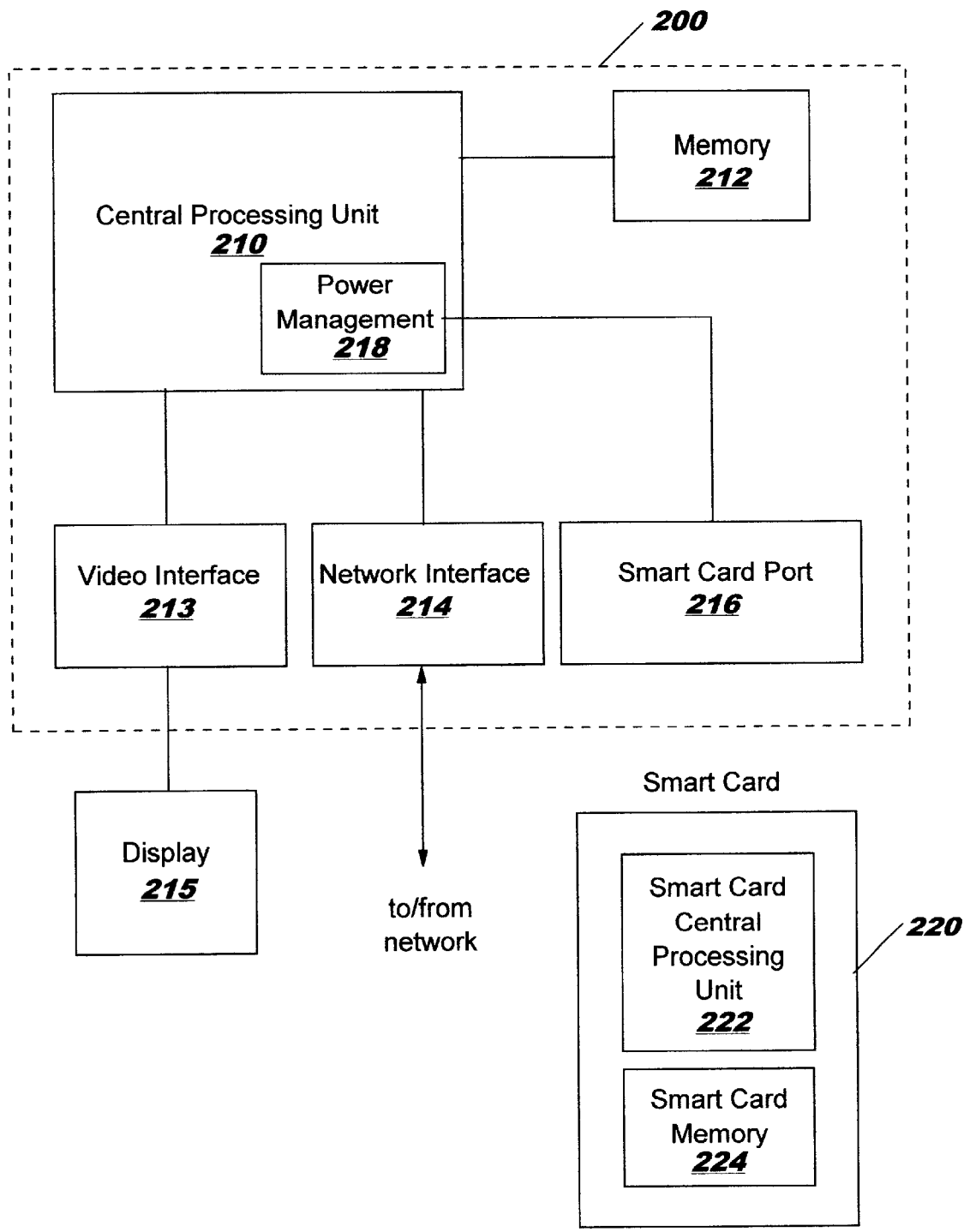
FIG. 2 is a block diagram of a network computer according to the present invention.

FIG. 2 illustrates one embodiment of a network computer according to the present invention. FIG. 2 illustrates the network computer system unit 200 and display 215 as well as are access card such as a smart card 220. As seen in FIG. 2, a network computer system unit 200 may include a central processing unit (CPU) 210 which may include a power management unit 218, memory 212, a network interface 214, a smart card port 216, and a video interface 213. The central processing unit 210 may be a microprocessor such as Pentium® Processor from Intel® Corporation (Santa Clara, Calif.) or other microprocessor. The memory 212 may include random access memory (RAM), read only memory (ROM). electrically erasable programmable read only memory (EEPROM) or other types of memory known to those of skill in the art. Furthermore, the memory 212 may include cache such as a level 2 (L2) cache, an instruction cache, a data cache or any combination thereof.

The power management unit 218 of the present invention provides for manipulating the various components of the network computer 200 so as to regulate or control the power consumed by the network computer 200. For example, the power management unit 218 may disable the network interface 214, the memory 212, the non-power management functions of the central processing 210, the video interface 213 and the display 215 when a user is not utilizing the network computer 200. Thus, when no user is present, the network computer may require only minimal power. Furthermore, some subsystems can be placed in power-saving modes independent of each other and some can be placed in power-saving modes even when a user is present and active. For example, if a user is present but is not using audio, then power management may power down the audio subsystem to provide increased power savings.

As is illustrated in FIG. 2, the power management unit 218 may be incorporated into the central processing unit as computer program code executing on the central processing unit or a combination of computer program code and hardware associated with the central processing unit. Power management unit 218 may be independent of the central processing unit 210 so as to minimize power utilized when no user is utilizing the network computer.

As will be appreciated by those of skill in the art, additional features may be incorporated into the network computer 200, such as serial and/or parallel communication interfaces, a video acceleration card, sound and other multimedia cards as well as multiple network interfaces. Furthermore, a network computer according to the present invention may include a personal computer emulating a network computer such as is disclosed in concurrently filed, commonly assigned U.S. Pat. No. 5,926,631 entitled *Network Computer Emulator Systems, Methods and Computer Program Products for Personal Computers*, the disclosure of which is incorporated by reference as if set forth fully.

FIG. 2 also illustrates an access card 220 associated with the network computer of the present invention. The access card 220 may be a smart card in that a central processing unit 222 and memory 224 are provided on the access card 220. When the access card 220 is placed in the smart card port 216 of the network computer, the network computer may communicate with the smart card central processing unit 222. The access card 220 allows for secure information to be stored in the access card memory 224 in an encrypted format that can only be accessed through the central processing unit 222. Thus, user information including a user identification and password as well as user preferences and power management information may be stored on the access card 220 in a secure format such that the information may not be replicated without authorization.

When installed in the smart card port 216, the central processing unit 210 and power management unit 218 may sense the presence of the access card 220 and access the access card 220 to retrieve the information stored on the access card 220. Furthermore, as described below, the power management unit 218 may maintain the network computer in a low power state until the presence of a an access card, such as a smart card, is detected.

Figure 3:
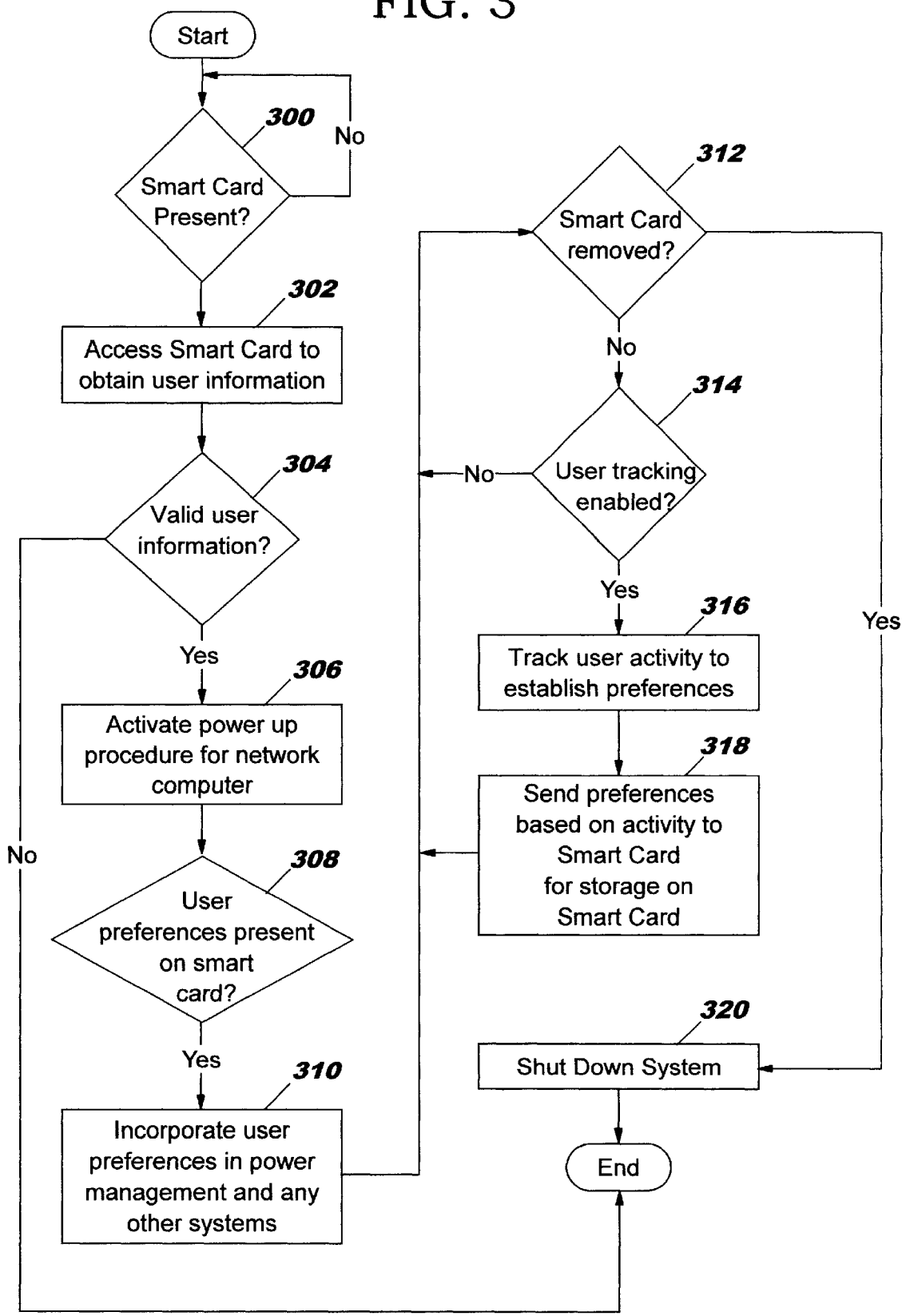
FIG. 3 is a flowchart illustration of operations of network computer systems, methods and computer program products including access card presence detection, power management and user validation according to the present invention.

The present invention will now be described with reference to FIG. 3, which is a flow chart illustrating the operation of a network computer according to the present invention. Initially, the power management unit 218 of the network computer maintains the computer in a low power state. This state may include providing no or only minimal power to the display 215, the network interface 214, the video interface 213, the memory 212 and the smart card port 216. Furthermore, the non-power management functions of the central processing unit may also be curtailed so that the central processing unit utilizes a minimum of power. This may also include reducing the operating frequency of the central processing unit to further conserve energy. As seen in FIG. 3, the network computer detects the presence of a smart card 220 in the smart card port 216 (block 300). Sufficient power may then be provided to the smart card port 216 to allow accessing the smart card 220 and the smart card 220 is accessed to obtain user information (block 302). Smart cards and methods of accessing and storing information on smart cards are known to those of skill in the art. The user information obtained from the smart card, which may include decryption keys used for accessing smart card data via the smart card's processor, a personal identification number (PIN) and/or password and a user logon identifier name, may then be verified to determine if a valid user is using the network computer (block 304) and if not, then the power management unit 218 would return the network computer to the minimum power state thus preventing access to the network computer by the unauthorized user.

If the user is authorized, then the power management unit 218 activates the power up procedure for the network computer (block 306). The power up procedure may include providing power to the display 215, the network interface 214, the video interface 213, the memory 212 and other parts of the smart card 220 port 216. Furthermore, the central processing unit 210 may be operated at full speed.

If user preferences are present on the smart card 220 (block 308), these user preferences may be incorporated in power management (block 310). Also, as the system is powered up, the network computer may utilize the network interface 214 to access the network server and download the operating system, run-time environment and any applications or data required by the user. The applications loaded, appearance of the desktop or other characteristics of the network computer may also be stored on the smart card and incorporated in the start up procedure.

Types of user preferences as to power management which may be specified on the smart card 220 may include, among others, screen saver selection, screen saver time delay, display deactivation times, or power management level. As one of skill in the art would appreciate, any number of system parameters may be specified for a user utilizing the smart card to transport them from network computer to network computer. More specifically, additional power management parameters which may be saved include power management activity monitoring enable, power management "screen-saver" mode enablement and timeout values, power management "suspend" mode enablement and timeout values, power management power-saving aggressiveness preference, power management energy level warning levels, power management battery charging preference, and power management aggressiveness tuning factors.

More specifically, power management activity monitoring enable enables or disables power mode changes based on user activity monitoring. Power management power-saving aggressiveness preference is an integer value indicating a preference for weighting of the performance versus power-savings tradeoff. For example, a value of 0 might indicate that the user desires maximum performance at the cost of minimal power savings. Power management energy warning levels specify at what percent of energy left in a battery should power management warn the user. Power management battery charging preference is an integer value indicating a preference for the weighting of battery charging rate versus power-savings and performance. Power management aggressiveness tuning factors are discussed below.

Returning to FIG. 3, the network computer may also sense when a smart card 220 has been removed from the smart card port 216 (block 312). If the smart card 220 has been removed, then the power management unit 218 assumes that the user no longer wants to use the network computer and shuts down the system (block 320). The power management unit 218 may utilize methods known to those of skill in the art to achieve an orderly shut down of the network computer.

However, while the smart card 220 is installed in the smart card port 216, if user tracking is enabled (determined in block 314), then the network computer may track the activities of the user to establish a profile for user defined preferences such as screen saver timers and the like (block 316). For example, the time spent in power modes and the frequency of power mode transitions may be monitored. Transitions between power modes result from keystrokes, mouse movements, joystick input, or digital/light pen input. Based on the monitored information, a non-disruptive timer duration for entering reduced power modes may be established. If user tracking is not enabled, operations return to block 312 where it determines if the Smart card 220 has been removed.

A particular example of monitoring user activity to establish power management preferences is the power management aggressiveness tuning factors mentioned above. Power management aggressiveness tuning factors are values which are initialized and maintained by the power management unit. Power management uses these values in combination with the user's aggressiveness and/or charging preferences in order to achieve an optimal balance of performance, power saving and charging. Power management tracks user activity, and if it finds that the user tends to be more active than their aggressiveness preference indicates, then the tuning factor is set so as to shift the performance/power-savings trade-off toward performance. Otherwise, if power management finds that the user tends to be less active than their aggressiveness preference indicates, then the tuning factor is set so as to shift the balance toward power savings. The tuning factor may be modified when power management detects either an excessive number of power mode transitions (the user repeatedly "wakes up" the system soon after it enters power-saving mode) or too few power mode transitions for long periods of user idleness.

After establishing such parameters, these parameters may be provided to the smart card for storage on the smart card (block 318). If the user tracking is not enabled, operations return to block 312. Alternatively, the parameters may be stored on the network server and access information, such as the mechanism to retrieve the parameters, location of the parameters and user identification, stored on the smart card. The parameters would then be accessed at the network server using the smart card information. The parameters may then be transported from network computer to network computer such that a user will have consistent operation across multiple network computers. However, to provide power management across multiple networks, the power management information is preferably stored on the smart card rather than at the network server.

As the description above makes clear, as long as the smart card 220 is placed in the network computer, the power management system operates as if a user is present. Thus, no timers or other mechanisms need be provided for sensing the presence of a user. Thus, the smart card may act as an intelligent "power on" switch for the network computer such that a conventional power switch need not even be provided.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of controlling a network computer having an access port for receiving an access card which includes a processor and storage for providing secure user information, the method comprising the steps of:

detecting the presence in the network computer of the access card;

tracking user activity on the network computer by tracking transitions between power modes and time spent in power modes to establish power management preferences for a user;

storing the established power management preferences to provide network computer independent power management preferences as user specific information stored on the access card;

accessing the access card to obtain the user specific information; and controlling the power management of the network computer based upon the user specific information obtained from the access card.

2. A method according to claim 1, wherein the user specific information comprises power management parameters selected from the group comprising power management activity monitoring enable, power management "screen-saver" mode enablement and timeout values, power management "suspend" mode enablement and timeout values, power management power-saving aggressiveness preference, power management energy level warning levels, power management battery charging preference, and power management aggressiveness tuning factors.

3. A method according to claim 1, wherein said step of controlling the power management comprises the step of activating the network computer when the access card is present in the access port.

4. A method according to claim 3, wherein said step of controlling the power management further comprises the step of setting a power management mode of the network computer based upon the user specific information.

5. A method according to claim 3, wherein said step of controlling the power management further comprises the step of deactivating the network computer when the access card is removed from the access port.

6. A method of providing user information to a network computer, the method comprising the steps of:

storing user specific information on an access card which includes a processor and storage such that information stored on the access card may only be accessed through the processor of the access card so as to provide secure data on the access card;

tracking user activity on the network computer by tracking transitions between power modes to establish user preferences for a user associated with the access card;

storing the established user preferences on the access card as user specific information to provide network independent user preferences;

providing the access card to a network computer; and accessing the access card to obtain the user specific information independent of the network connections of the network computer.

7. A method according to claim 6, wherein the access card comprises a smart card and wherein the user specific information comprises encrypted user specific information.

8. A method according to claim 6, wherein the user specific information comprises power management information, said method further comprising the step of utilizing the power management information to control the power management of the network computer.

9. A method according to claim 6, wherein the user specific information comprises a user identification, said method further comprising the steps of:

validating the user identification stored on the access card; and allowing access to the network computer by a user if said step of validating the user identification determines that the user identification is valid.

10. A network computer comprising:

a central processing unit;

a memory operatively associated with the central processing unit;

a network interface operatively associated with the central processing unit;

an access card comprising:
       access card central processing unit; and
       access card memory operatively associated with the access card central processing unit;

an access card port operatively associated with the central processing unit, which receives said access card and allows for communication with said access card central processing unit; and a power management controller, operatively associated with said access card port and responsive to said access card, which controls the power state of the network computer and which is configured to track user activity on the network computer by tracking transitions between power modes to establish power management preferences for a user and store the established power management preferences on the access card to provide network computer independent power management information.

11. A network computer according to claim 10, wherein said power management controller is further configured to activate the network computer when the access card is present in the access card port and deactivate the network computer when the access card is removed from the access card port.

12. A network computer according to claim 10, further comprising:

means for validating user identification stored on the access card; and wherein the power management controller is configured to activate the network computer responsive to the means for validating if said means for validating the user identification determines that the user identification is valid.

13. A network computer, comprising:

an access card which includes a processor and storage and is configured to store user specific information in the storage of the access card such that the user specific information stored on the access card may only be accessed through the processor of the access card so as to provide secure data on the access card;

an access card port configured to provide access to the access card to the network computer and configured to allow the network computer to access the access card to obtain user specific information independent of the network connections of the network computer; and wherein the network computer is further configured to track user activity on the network computer by tracking transitions between power modes and time spent in power modes to establish user preferences for a user associated with the access card and store the established user preferences on the access card to provide network computer independent user preferences.

14. A network computer according to claim 13, wherein the access card comprises a smart card and wherein the user specific information comprises encrypted user specific information.

15. A network computer according to claim 13, wherein the user specific information comprises power management information, said system further comprising means for utilizing the power management information to control power management of the network computer.

16. A network computer according to claim 13, wherein the user specific information comprises a user identification, said system further comprising:

means for validating the user identification stored on the access card; and means for activating the network computer if said means for validating the user identification determines that the user identification is valid.

17. A computer program product for controlling a network computer having an access port for receiving an access card which includes a processor and storage for providing secure user information, the computer program product comprising:

a computer-readable storage medium having computer-readable program code means embodied in said medium, said computer-readable program code means comprising:

computer-readable program code means for detecting the presence in the network computer of the access card;

computer-readable program code means for tracking user activity on the network computer by tracking transitions between power modes and time spent in power modes to establish power management preferences for a user;

computer-readable program code means for storing the established power management preferences on the access card to provide network computer independent power management preferences as user specific information;

computer-readable program code means for accessing the access card to obtain the user specific information; and computer-readable program code means for controlling the power management of the network computer based upon the user specific information.

18. A computer program product according to claim 17, wherein said computer-readable program code means for controlling the power management further comprises computer-readable program code means for setting a power management mode of the network computer based upon the user specific information.

19. A computer program product according to claim 17, wherein the user specific information comprises power management parameters selected from the group comprising power management activity monitoring enable, power management "screen-saver" mode enablement and timeout values, power management "suspend" mode enablement and timeout values, power management power-saving aggressiveness preference, power management energy level warning levels, power management battery charging preference, and power management aggressiveness tuning factors.

20. A computer program product according to claim 17, wherein said computer-readable program code means for controlling the power management comprises computer-readable program code means for activating the network computer when the access card is present in the access port.

21. A computer program product according to claim 20, wherein said computer-readable program code means for controlling the power management further comprises computer-readable program code means for deactivating the network computer when the access card is removed from the access port.

22. A computer program product for providing user information to a network computer, the computer program product comprising:

a computer-readable storage medium having computer-readable program code computer-readable program code means embodied in said medium, said computer-readable program code computer-readable program code means comprising:

computer-readable program code means for storing user specific information on an access card which includes a processor and storage such that information stored on the access card may only be accessed through the processor of the access card so as to provide secure data on the access card;

computer-readable program code means for tracking user activity on the network computer by tracking transitions between power modes to establish user preferences for a user associated with the access card;

computer-readable program code means for storing the established user preferences on the access card to provide network computer independent user preferences as user specific information;

computer-readable program code means for providing access to the access card to a network computer; and computer-readable program code means for accessing the access card to obtain user specific information independent of the network connections of the network computer.

23. A computer program product according to claim 22, wherein the access card comprises a smart card and wherein the user specific information comprises encrypted user specific information.

24. A computer program product according to claim 22, wherein the user specific information comprises power management information, said computer program product further comprising computer-readable program code means for utilizing the power management information to control the power management of the network computer.

25. A computer program product according to claim 22, wherein the user specific information comprises a user identification, said computer program product further comprising:

computer-readable program code means for validating the user identification stored on the access card; and computer-readable program code means for allowing access to the network computer by the user if said computer-readable program code means for validating the user identification determines that the user identification is valid.

* * * * *